TRANSMISSION SYSTEMS

Filed Jan. 29, 1960 7 Sheets-Sheet 1

INVENTORS.
PAUL R. ADAMS
MORTIMER ROGOFF
BY Alfred C. Hill
AGENT

Aug. 24, 1965 P. R. ADAMS ETAL 3,202,764

TRANSMISSION SYSTEMS

Filed Jan. 29, 1960 7 Sheets-Sheet 2

INVENTORS.
PAUL R. ADAMS
MORTIMER ROGOFF
BY Alfred C. Hill
AGENT

Aug. 24, 1965 P. R. ADAMS ET AL 3,202,764

TRANSMISSION SYSTEMS

Filed Jan. 29, 1960 7 Sheets-Sheet 3

INVENTORS.
PAUL R. ADAMS
MORTIMER ROGOFF

BY Alfred C. Hill

AGENT

INVENTORS.
PAUL R. ADAMS
MORTIMER ROGOFF
BY Alfred C. Hill
AGENT

INVENTORS.
PAUL R. ADAMS
MORTIMER ROGOFF
BY Alfred C. Hill
AGENT

INVENTORS.
PAUL R. ADAMS
MORTIMER ROGOFF
BY Alfred C. Hill
AGENT

INVENTORS.
PAUL R. ADAMS
MORTIMER ROGOFF
BY Alfred C. Hill
AGENT

United States Patent Office 3,202,764

Patented Aug. 24, 1965

3,202,764

TRANSMISSION SYSTEMS

Paul R. Adams, Montclair, and Mortimer Rogoff, Nutley, N.J., assignors to International Telephone and Telegraph Corporation, Nutley, N.J., a corporation of Maryland Filed Jan. 29, 1960, Ser. No. 5,392

20 Claims. (Cl. 179—15)

This invention relates to transmission systems, and more particularly to time compressor and time expander arrangements to enhance the transmission of the complex signals, such as speech, music, sound, mechanical vibrations, telegraph signals and picture signals.

Complex signals have been transmitted by various techniques. One such technique includes the periodic sampling of the complex signal with the samples of the complex signal being converted into a pulse signal representative of the amplitude of the sample, such as in pulse time modulation, pulse width modulation or pulse code modulation systems. A second technique involves the perforation of a tape in a predetermined manner in accordance with the amplitude variations of the complex signal. A third technique converts the complex signal into a plurality of control signals, one control signal representing the fundamental frequency of the complex signal and each of the other control signals representing the distribution of amplitude of the complex signal in a given one of a number of frequency bands into which the complex signal frequency range is divided. These control signals are all translated sequentially to the same radio frequency narrow band and are transmitted to a synthesizer to approximately activate sources of energy therein, to create an artificial complex signal having the characteristic fundamental frequency and amplitude-frequency distribution of the original complex signal.

Where it is desirable to provide a number of simultaneously operating channels in a particular radio frequency band various multiplex methods are employed depending upon which of the above techniques is involved. If the first of the above techniques is employed, usual time division multiplex methods may be utilized to time interleave the plurality of channel pulse signals in the sampling period of a single channel. If the second of the above techniques is employed, tapes representing a plurality of complex signals may be spliced together to provide a continuous tape for feeding into a tape transmitter to sequentially transmit the individual complex signals at speeds higher than the speed at which the tapes were perforated. If the third of the above techniques is employed the channels are provided by employing frequency division multiplex techniques; that is, each of the channels is assigned a different narrow radio frequency band for its operation in a given geographical area.

This latter type of multiplex transmission of a plurality of complex signals results in the problems of mutual interference and crosstalk between the large number of narrow band radio frequency channels simultaneously operating in a given geographical area. The second type of multiplex transmission has the disadvantage of requiring a mechanical or manual perforation of a tape and then the splicing of a plurality of tapes into a continuous tape prior to its transmission to a remote location.

The first type of multiplex transmission requires extremely accurate timing to properly interleave the channel pulse signals and prevent cross-talk between the channel pulse signals, particularly where a large number of channels are required to be interleaved in a repetition period which is determined by the highest frequency expected in the complex signals. The interleaving of say 48 channels or more in a period of the usual 125 microseconds repetition period disposes the channel pulse signals relatively close together and increases the possibility of cross-talk between the channels. In each of the above techniques of complex signal transmission, the complex signal is converted to another signal representative of the complex signal and is transmitted to a remote point in this form.

An object of this invention is the provision of a complex signal transmission system providing simultaneous operation of a plurality of complex signal channels over one or possibly two or three wideband radio frequency channels in a given radio frequency band in a given geographical area employing time division multiplex techniques in a manner to reduce the above-mentioned problems encountered in the previous channeling arrangement.

Another object of the present invention is to time compress complex signals so that a plurality of such time-compressed complex signals may be time interleaved at one end of one wideband radio frequency channel with each of the compressed complex signals being time expanded at the other end of said radio frequency channel to recover the original complex signal.

Still another object of the present invention is the employment of a delay line storage system to impart to the complex signal a scrambled characteristic preventing access to the complex signal by unauthorized persons.

A feature of this invention is the provision of an arrangement, including a translation device such as a delay line storage system, to divide a complex signal into a plurality of successive signal segments each having a given time duration and to sequentially condense each of said signal segments into a time duration less than said given time duration. The condensed signal segments are made continuous to recover the original complex signal by employing a translation device similar to the one above but operating substantially in reverse to sequentially dilate each of the signal segments to occupy said given time duration.

Another feature of this invention is the utilization of delay line signal storage ssytems arranged in one instance to circulate and process in a given sequence pulse signals spaced with respect to each other representative of a signal segment to compress the signal segments of a complex signal and arranged in another instance to circulate and process in a given sequence pulse signals in time adjacent relationship with respect to each other representative of a compressed signal segment to expand the compressed signal segments of a complex signal to recover the original complex signal. The pulse signals are converted to ultrasonic pulse signals when fused quartz delay lines are employed.

A further feature of this invention is the utilization of delay line storage systems of the circulating type including a delay line section having a time delay related to the time interval between adjacent ones of a plurality of pulse signals to alter the time relationship between the adjacent ones of the plurality of pulse signals, the sequence of the indiviual pulse signals being maintained as applied to the delay line section or altered in a predetermined manner, and a device at the output of the delay line section to present at the output of the storage system the pulse signals of the plurality of pulse signals as present on the delay line section or yet another sequence derived from the sequence on the delay line section. When the output signal of the storage system is demodulated prior to transmission a scrambled complex signal segment results and, hence, reduces the possibility of unauthorized access to the information transmitted.

Still a further feature of this invention is the sampling of the signals within the signal segments and translating these samples to a coded pulse signal representation thereof to be circulated in the delay line storage systems, as above described, said coded signal representations being decoded prior to being propagated and prior to recovering the original complex signal.

The above-mentioned and other features and objects of this invention will become more apparent by reference to the following description taken in conjunction with the accompanying drawings, in which.

Figure 1:
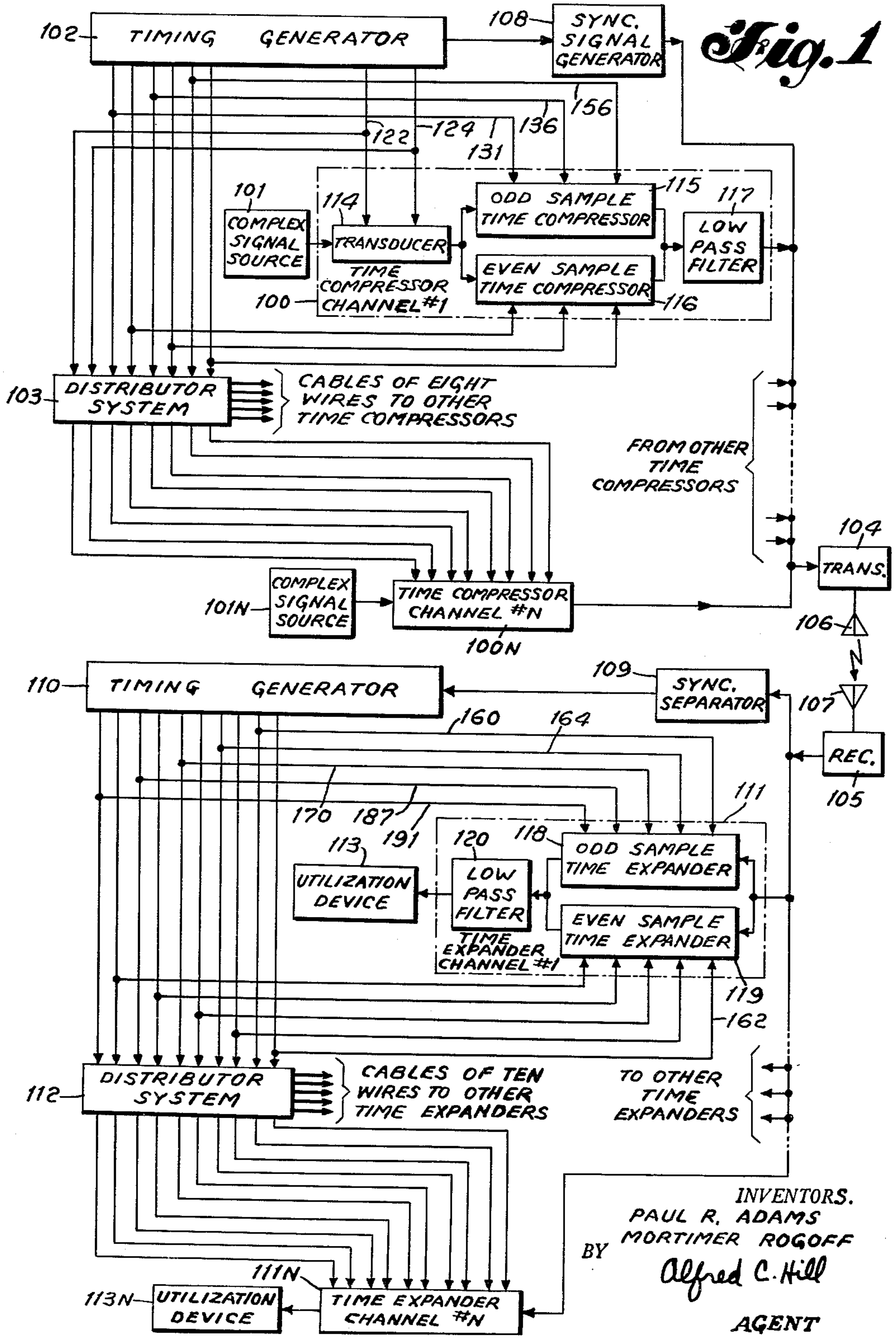
FIG. 1 is a schematic diagram in block diagram form of a multichannel transmission system following the principles of this invention.

Referring to FIG. 1, there is illustrated therein a transmission system for transmitting a plurality of complex signals between two remote locations employing the time compressor and time expander arrangement of this invention. Each complex signal channel includes therein at the transmitter end of the transmission system a time compressor 100 operating on the complex signals as supplied from source 101. Under the influence of timing signals from timing generator 102, the time compressors 100 operate to divide each complex signal into successive signal segments having a given duration, such as, for instance, a one-second duration. Each of time compressors 100 further operate as a translation device to sequentially condense in time each of the signal segments into a time duration less than the given time duration, for instance, an 8 millisecond duration. Thus, the signals from sources 101 are condensed into signal segments of 8 milliseconds, in the example employed herein, thereby resulting in a train of condensed signal segments time spaced by 1,000 milliseconds minus 8 milliseconds or 992 milliseconds. By proper distribution of the timing signals of generator 102 by distributor system 103, the plurality of channel signal trains will be time displaced with respect to each other to enable the time interleaving of the plurality of channel signal trains into a time division multichannel pulse train. Distributor system 103 may take the form of high speed switching matrices, cathode ray beam tubes, high speed mechanical distributor or any similar distributor. The resultant multichannel pulse train is coupled to transmitter 104 for transmission to receiver 105, for instance, by means of electromagnetic wave propagation between antennas 106 and 107. It is to be understood that the transmission between transmitter 104 and receiver 105, may be accomplished by employing other techniques and other propagation media, such as a waveguide or open wire transmission system.

Thus, the time compressors of this invention enable the transmission of a large number of complex signals. In the example hereinbefore cited, 100 complex signals can be transmitted sequentially in each complex signal segment This enables 100 complex signal channels to be multiplexed onto one wide band radio frequency channel.

A synchronizing signal generator 108 is coupled to timing generator 102 to produce a distinctive signal which may be separated from the multichannel pulse train to properly synchronize the operation of the receiving station with the transmitting station to recover the plurality of complex signals. The synchronizing signal produced in generator 108 is separated from the multichannel pulse train by means of the synchronizing separator 109 in the receiving station, the output of which times the generation of the timing signals developed in timing generator 110. A plurality of time expanders 111 are coupled to the output of receiver 105 and to the timing signal outputs of timing generator 110 through distributor system 112 to separate the appropriate channel signal from the multichannel pulse train and as a translation device to expand or dilate the condensed signal segments to a duration including the interval between adjacent ones thereof, that is, back to their original duration, to render the complex signal continuous. The resultant continuous complex signal is coupled to utilization device 113. Distributor system 112 will operate like distributor system 103 of the transmitting station and may be any of the types mentioned in connection with system 103.

Timing generators 102 and 110 may be a well known type including a basic signal generator coupled to counters of the binary type and matrices of the diode type to generate the appropriate timing signals for the operation of the compressor and expander arrangements of this invention to meet a specific set of requirements and specifications for a particular application.

The compressor and expander arrangements 100 and 111 respectively, are signal storage systems with the compression and expansion in time of the signals applied thereto being controlled by the speed of read-in and read-out. The time compressor and expander will take the form of a delay line storage system which may include either piezoelectric or magnetostrictive ultrasonic delay line sections. Piezoelectric delay line sections may be of either the mercury filled or fused quartz type, while the magnetostrictive delay line sections may be in the form of a bundle of finely-drawn nickel wires.

Briefly, it is preferred that the time compressor operates to convert each of the successive signal segments of the complex signal into a plurality of pulse signals representative thereof, adjacent ones thereof being time spaced with respect to each other by a given amount, and to condense the plurality of pulse signals to be time adjacent with respect to each other. In this manner the dead time or, in other words, the time interval between adjacent pulse signals is eliminated and the time interval required for the whole signal segment is considerably condensed. The pulse signals are formed by sampling the complex signal segments sequentially at a predetermined rate. The resultant pulse signal will be a pulse having an amplitude equal to the amplitude of the complex signal at the time of sampling. The sampling of the complex signal will be done in transducer 114 illustrated in compressors 100.

It is illustrated in compressor 100 that the pulse signal output of transducer 114 is coupled to a parallel arrangement of time compressors identified as an odd sample time compressor 115 and an even sample time compressor 116. This parallel arrangement of time compressors is desirable in certain applications to enable the operation of the compressor at convenient video and radio frequency bandwidths. Hence, the pulse signal of samples 1, 3, 5, etc. of the complex signal are operated upon by the odd sample time compressor 115 and the pulse signal of samples 2, 4, 6, 8, etc. are operated upon by the even sample time compressor 116. The outputs of time compressors 115 and 116 are interleaved and passed through a low-pass filter 117 to convert the condensed pulse signal representative of a complex signal segment into the condensed complex signal segment.

Due to certain limitations in the operation of the storage capacity, and distortion present in certain types of delay lines, it is perferable that the pulse signal of a sample or pulse signal of the complex signal be in the form of a coded pulse signal, preferably in binary form. The generation of the coded pulse signal would take place in transducer 114 illustrated in time compressor 100. The utilization of a coded representation of a sample of the complex signal is particularly important in delay line signal storage systems since it is necessary to circulate the samples a plurality of times through a single delay line system with regenerating amplifiers disposed appropriately along the length of the delay line system. If a constant level coded representation of the sampled amplitude were not utilized, considerable distortion would be introduced in the amplitude varying pulses of a sample by the inherent non-linearity of the regenerating amplifiers. No matter how small this non-linearity may be in any one amplifier, an amplitude varying pulse being circulated many hundreds of times through the amplifiers will be severly distorted at the end of the process.

The time expander 111 will include substantially the same components as the compressors 100 with the signal storage system being arranged to operate in a reverse fashion in order to dilate the condensed signal segment back to its original time duration and render the complex signal continuous. As illustrated, time expander 111 may include an odd sample time expander 118 and an even sample time expander 119. Expander 118 and 119 will be timed to alternately sample the condensed complex signal segment to thereby effectively develop odd and even samples of the condensed signal segments. After the expansion or dilation process the output of expanders 118 and 119 will be time interleaved and passed through a low-pass filter 120 for recovery of each of the expanded complex signal segments to produce a distortion-free replica of the original complex signal.

FIGS. 2 to 7 illustrate in greater detail a preferred embodiment of compressor 100 and expander 111 of FIG. 1. The particular time spacing, time duration and rate of timing signals employed in the description of this embodiment is solely for purposes of explanation and is not meant to limit the invention in any manner. For convenience of description in this example a signal segment has been given a duration of 1.008 seconds and the rate of the various timing signals are expressed as so many pulses per 1.008 second.

Figure 2:
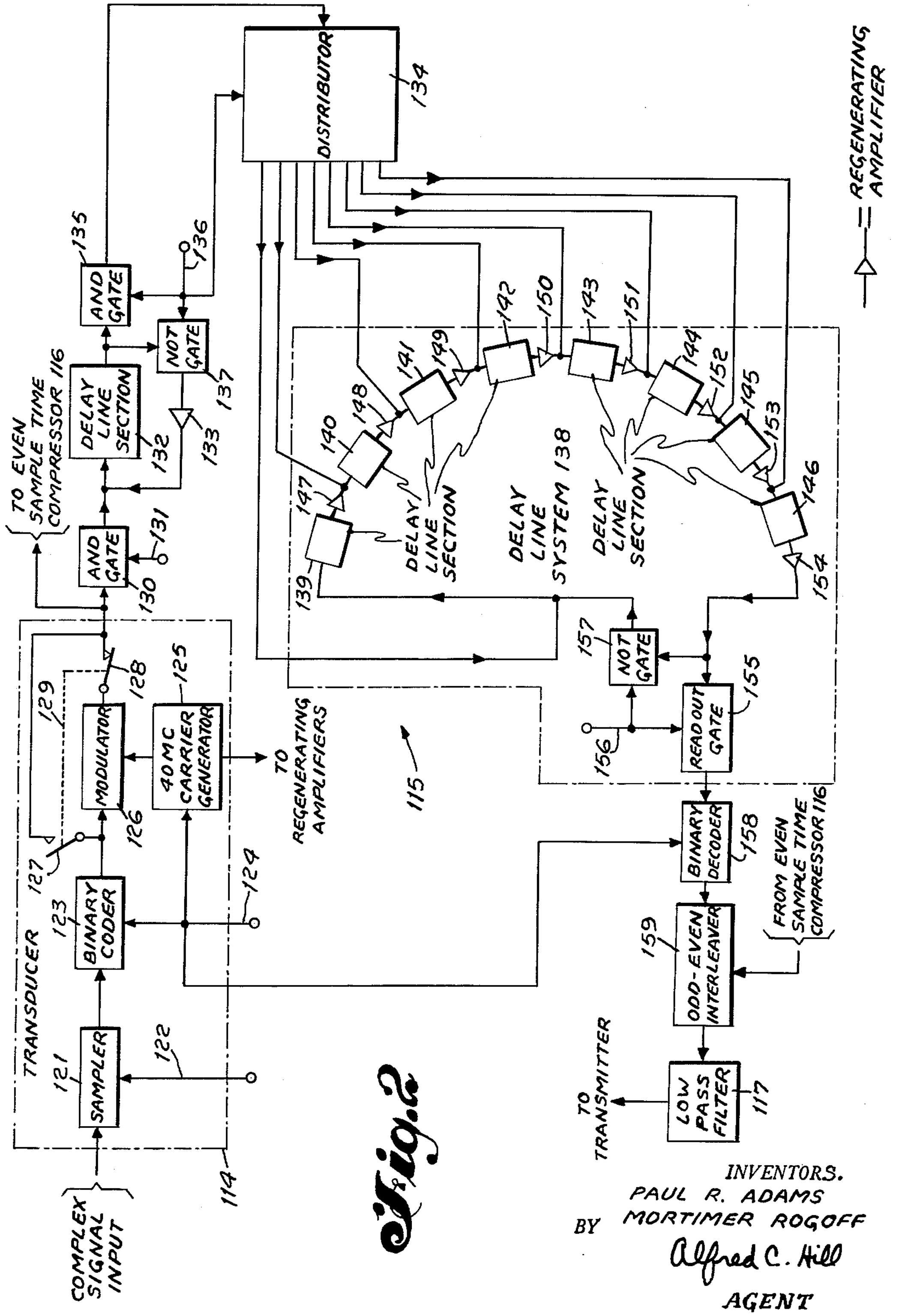
FIG. 2 is a schematic diagram in block form of one half of the time compressor of FIG. 1.

Referring to FIG. 2 there is illustrated therein a delay line time compressor following the principles of this invention. A complex signal input is coupled to transducer 114 which includes therein sampler 121 whose timing is controlled by a signal from timing generator 102 of FIG. 1 coupled over conductor 122. In accordance with the illustrative example employed herein, the timing signal on conductor 122 will have a rate of 8,000 pulses per 1.008 seconds and a pulse width of approximately one microsecond. Thus, the sampler 121 will produce 8,000 sample pulses every 1.008 seconds, each of the sample pulses having an amplitude which is proportional to the amplitude of the complex signal at the particular instant of sampling, as is illustrated in curve A, FIG. 3. The output of sampler 121 is coupled to a coder to generate a code pulse group representative of the amplitude of a particular sample pulse. The coder is illustrated as a portion of transducer 114 and is identified as binary coder 123. The timing of the coder 123 is controlled by a timing signal from timing generator 102 of FIG. 1 coupled over conductor 124 having a repetition rate of 4,032,000 pulses per 1.008 seconds and a pulse width of one eighth of a microsecond. The resultant output of coder 123 is illustrated in curve B, FIG. 3 wherein the code groups are separated by 126 microseconds and the code pulse group is illustrated as being formed by eight digit positions wherein the digit positions are separated by ⅛ microsecond and the digit positions have a duration of ⅛ microsecond providing a duration for a code group of two microseconds. This detail of a code pulse group is illustrated by the enlargement of one of the code pulse groups illustrated in curve B. Only six of the digit positions of a code group may be utilized to convey the amplitude of a sample pulse with the other two digit positions being utilized to provide guard time between adjacent code pulse groups to reduce error. It would be possible to employ all eight digit positions in an error-correcting type code system where the last two digit positions rather than providing guard time are check digit positions to enable the detection of an error in the code pulse group. The timing for the coder 123 as coupled along conductor 124 is determined by the spacing between the digit positions of the code group and hence, may be considered the digit position repetition rate. If a piezoelectric delay line section of the quartz type is employed, it is desirable that the pulses at the output of code 123 be inserted in the delay line sections in the form of ultrasonic energy. In the example employed herein this ultrasonic energy is considered to be centered in a band at 40 megacycles. To enable the development of this necessary ultrasonic energy, a generator 125 is provided which is timed by the timing signal on conductor 124 to produce pre-timed pulses of 40 megacycle carrier energy. The output of generator 125 is coupled to modulator 126 which operates so that every pulse from coder 123 gates the 40 megacycle carrier to thereby provide at the output of modulator 126 a properly timed ultrasonic pulse at a center frequency of 40 megacycles. If magnetostrictive lines are employed, the video pulses at the output of coder 123 may be applied directly to these lines and hence, the carrier generator 125 and modulator 126 would be unnecessary. To illustrate these alternative possibilities and a switching arrangement including switches 127 and 128, mechanically ganged as illustrated by the dotted line 129, provide an anrrangement whereby the modulator 126 and generator 125 may be bypassed if the delay line sections employed are magnetostrictive type or these components may be placed in operation if the delay line section employed are of the quartz type. In the position illustrated, the delay line sections are of the quartz type thereby placing generator 125 and modulator 126 in operation.

At the output of modulator 126 there is present the code pulse groups representing the sampled amplitude of the complex signal spaced one from the other by 126 microseconds. As illustrated in FIG. 1, the output from transducer 114 is split for application to an even sample time compressor 116 and an odd sample time compressor 115. The remainder of the components illustrated in FIG. 2 are those incorporated in the odd sample time compressor 115, the even sample compressor 116 including substantially identical components operating in substantially the same manner as described hereinbelow.

Gate 130 is coupled to the output of transducer 114 and timed in its operation by a timing signal from timing generator 102, FIG. 1, coupled along conductor 131. The timing signal on conductor 131 has a rate of 4,000 pulses per 1.008 seconds and a pulse width of two microseconds properly phased or timed for coincidence with the odd code pulse groups. Gate 130 thus separates the odd code pulse groups from the even code pulse groups and produces at the output thereof the code pulse groups as illustrated in curve C, FIG. 3 separated by 252 microseconds.

The odd sample code pulse groups are coupled to a first compressor delay line system including delay line section 132. In accordance with the example employed herein for illustrative purposes, the time delay of delay line 132 will be 250 microseconds, which is two microseconds less than the spacing between adjacent code pulse groups. The first compressor delay line system includes a feed back arrangement to couple the code pulse groups at the output of delay line section 132 to the input thereof to cause a circulation of each of the code pulse groups through the delay line section 132 in a prescribed sequence, thus, the first compressor delay line system is a circulating line system. The feedback arrangement associated with delay line section 132 employs a regenerating amplifier 133 to reshape and synchronize the pulses as they are circulated through delay line section 132. In accordance with the example herein employed, the circulation process is permitted to run for four odd sample periods which will dispose code pulse groups 1, 3, 5 and 7 adjacent one another to provide a series of time adjacent code pulse groups identified by the letter A in curves D to G, FIG. 3, having a time duration of eight microseconds. In greater detail, the time compression in the first delay line system is as follows. Code group 1 enters delay section 132 propagates therethrough. When code group 3 is at the input of delay section 132 core group 1 is occupying the first two microseconds of delay section 132 and hence code groups 1 and 3 are in time adjacent relation These two code groups circulate in the system and occupy the first four microseconds of delay section 132 when code group 5 appears at the input thereof. This process continues until code groups 1, 3, 5 and 7 are in time adjacent relation. At the end of the four odd sample periods, after 1,008 microseconds have elapsed, the accumulated series of code pulse groups will be transferred to distributor 134 by means of AND gate 135, a component of the first compressor delay line system, timed by a timing signal from timing generator 102 coupled along conductor 136 having a rate of 1,000 pulses per 1.008 seconds and a pulse width of eight microseconds. NOT gate 137 included in the feedback arrangement associated with delay line section 132 is triggered by the timing signal on conductor 136 to open up the feedback path and stop the circulation process to prevent the series of the four code pulse groups from re-entering delay line section 132. The next four code pulse groups 9, 11, 13 and 15 will be accumulated in a similar manner in delay line section 132 until 1.008 microseconds have passed at which time this series of four code pulse groups identified by the letter B in curves D, F and G, FIG. 3 will be coupled to distributor 134. The adjacent series of code pulse groups will be placed by 1000 microseconds upon their application to distributor 134 as illustrated in curve D, FIG. 3.

Distributor 134 operates in accordance with the timing signal on conductor 136 to sequentially couple the series of time adjacent code pulse groups to appropriate locations in a second compressor delay line system 138 and may take the form of a high-speed switching matrix, a cathode ray beam tube or a high-speed mechanical commutator. Before describing the cooperation between distributor 134 and system 138, the components of system 138 will be described in greater detail. Delay line system 138 in accordance with the illustrative example employed herein will have a total time delay of eight milliseconds, the duration of the condensed signal segments. Since it is impractical to use a single delay line section as long as eight milliseconds in one unbroken element, due to stability considerations, particularly those arising from delay changes with temperatures, the delay line system 138 includes eight delay line sections 139 to 146, each having a time delay of one millisecond, interconnected by regenerating amplifiers 147 to 154. By thus restricting the delay line section lengths, it is possible to insure that delay errors will never exceed more than approximately 1/4 of the spacing between pulses being transmitted down the delay section. By keeping the delay error to within this degree of tolerance, it is possible for regenerating amplifiers driven by the output of generator 125 to restore the proper pulse timing.

Figure 3:
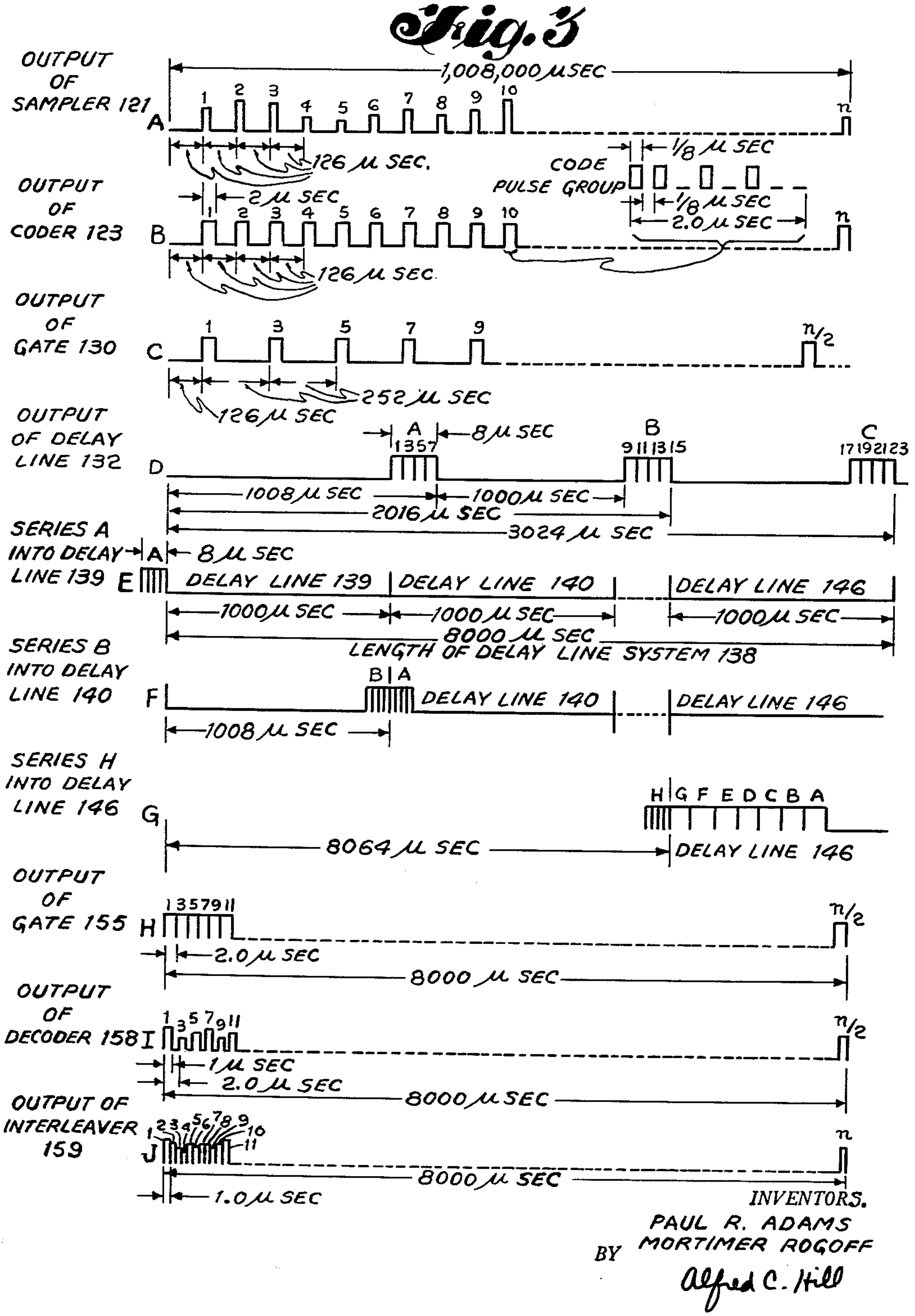
FIG. 3 is a series of curves to assist in the understanding of the operation of the circuit of FIG. 2.

Upon the arrival of code pulse group series A at distributor 134, series A is coupled to delay line section 139 as illustrated in curve E, FIG. 3. 1.008 microseconds later series A has cleared delay line section 139 and is eight microseconds into delay line section 140 and distributor 134 is timed to couple code pulse group series B into delay line section 140, as is illustrated in curve F, FIG. 3, This action continues sequentially so that code pulse group series C is applied to delay line section 141 when series A and B have just traveled sixteen microseconds into section 141, and so forth on around the delay line system until at the end of 8,064 microseconds series H is coupled to the input of delay line section 146. At this instance, series A, B, C, D, E, F and G have just completely entered delay line section 146 as illustrated in curve G, FIG. 3. Thus, at the end of 8,072 microseconds, series A to H code pulse groups are stored only in delay line section 146 and the time spacing between adjacent series has been completely eliminated. After 9,072 microseconds those pulse series stored in delay line section 146 will have circulated through NOT gate 157 and will be contained completely within delay line 139. At this instance of time, 9,072 microseconds after the start of the process, code pulse group series I is coupled to the input of delay line section 139 from distributor 134. The process of inserting series of code pulse groups sequentially into the input of delay line sections 139 to 146 as those series of code pulse groups already inserted circulate through delay line system 138 continues until all of the coded sample pulses of the 1.008 second duration (the complex signal segment duration) are stored in delay line system 138. After this process all of the coded complex signal samples of a given complex signal segment will be in time adjacent relationship and will completely fill the delay line system 138. The above operation of the first compressor delay line system including delay line section 132 and the second compressor delay line system 138 is demonstrated in the table immediately below. The table points up that the code pulse groups in spaced relationship with respect to each other are translated to a plurality of time space series of time adjacent code pulse groups in the first delay line system and that the time spaced series of code pulse groups are translated to a time adjacent relation in the second compressor delay line system. The last and next to last column of the table demonstrates that the circulation of series A to H in system 138 as series I and J, etc. are inserted into the system 138 disposes the spaced series of code pulse groups in a time adjacent relationship.

Delay line system 138 now has stored in a period of 8,000 microseconds all the signal samples taken during a signal segment, that is, in a 1.008 second period of time. It is now necessary that the accumulated time adjacent odd-numbered coded samples be read out in a period of 8,000 microseconds. This is accomplished by employing in the second delay line system 138 a read-out gate 155 whose operation is timed by a timing signal from timing generator 102, FIG. 1, coupled along conductor 156. The timing signal will have a pulse width of 8,000 microseconds and a repetition rate of 1 pulse per 1.008 seconds. The output of gate 155 is illustrated in curve H, FIG. 3. The timing signal on conductor 156 is likewise coupled to NOT gate 157 to open the circulation path or loop in delay line system 138 to prevent any further circulation of the time adjacent code pulse groups.

The output of gate 155 is coupled to a binary decoder 158 to reproduce amplitude varying pulses representative of the amplitude of a complex signal segment of the complex signal coupled to transducer 114 but in a timed condensed relationship with respect thereto. The timing of decoder 158 is accomplished by the timing signal on conductor 124. The amplitude varying pulses at the out-

*Table*

| Time in micro-seconds | Code pulse group entering delay line section 132 | Series of code pulse groups exciting delay line section 132 | Code pulse groups in series and departure time in microseconds from delay line section 132 | Delay in micro-seconds of series from series input to output of system 138 | Elapsed time in micro-seconds when series has arrived at output of system 138 | Elapsed time in micro-seconds after one circulation of series in system 138 |
|---|---|---|---|---|---|---|
| 0 | 1 | | | | | |
| 252 | 3 | | | | | |
| 504 | 5 | | | | | |
| 756 | 7 | | 1, 3, 5, 7 | | | |
| 1008 | 9 | A | 1000–1008 | 8,000 | 9000–9008 | 17,000–17,008 |
| 1260 | 11 | | | | | |
| 1512 | 13 | | | | | |
| 1764 | 15 | | 9, 11, 13, 15 | | | |
| 2016 | 17 | B | 2008–2016 | 7,000 | 9008–9016 | 17,008–17,016 |
| 2268 | 19 | | | | | |
| 2520 | 21 | | | | | |
| 2772 | 23 | | 17, 19, 21, 23 | | | |
| 3024 | 25 | C | 3016–3024 | 6,000 | 9016–9024 | 17,016–17,024 |
| 3276 | 27 | | | | | |
| 3528 | 29 | | | | | |
| 3780 | 31 | | 25, 27, 29, 31 | | | |
| 4032 | 33 | D | 4024–4032 | 5,000 | 9024–9032 | 17,024–17,032 |
| 4284 | 35 | | | | | |
| 4536 | 37 | | | | | |
| 4788 | 39 | | 33, 35, 37, 39 | | | |
| 5040 | 41 | E | 5032–5040 | 4,000 | 9032–9040 | 17,032–17,040 |
| 5292 | 43 | | | | | |
| 5544 | 45 | | | | | |
| 5796 | 47 | | 41, 43, 45, 47 | | | |
| 6048 | 49 | F | 6040–6048 | 3,000 | 9040–9048 | 17,040–17,048 |
| 6300 | 51 | | | | | |
| 6552 | 53 | | | | | |
| 6804 | 55 | | 49, 51, 53, 55 | | | |
| 7056 | 57 | G | 7048–7056 | 2,000 | 9048–9056 | 17,048–17,056 |
| 7308 | 59 | | | | | |
| 7560 | 61 | | | | | |
| 7812 | 63 | | 57, 59, 61, 63 | | | |
| 8064 | 65 | H | 8056–8064 | 1,000 | 9056–9064 | 17,056–17,064 |
| 8316 | 67 | | | | | |
| 8568 | 69 | | | | | |
| 8820 | 71 | | 65, 67, 69, 71 | | | |
| 9072 | 73 | I | 9064–9072 | 8,000 | 17,064–17,072 | |
| 9324 | 75 | | | | | |
| 9576 | 77 | | | | | |
| 9828 | 79 | | 73, 75, 77, 79 | | | |
| 10,080 | 81 | J | 10,072–10,080 | 7,000 | 17,072–17,080 | |

put of decoder 158 have a spacing therebetween of approximately one microsecond which is sufficient to permit the interleaving of the similarly produced even-sample time condensed amplitude varying pulses. Odd and even interleaver 159 operates to time interleave the output of decoder 158 and the output of a similar decoder in the even sample time compressor 116. The resultant signal is illustrated in curve J, FIG. 3. The output of interleaver 159 is coupled to low-pass filter 117 to recover a time condensed version of a signal segment of the original complex signal. The condensed signal segment is coupled to the transmitter 104 for propagation therefrom.

Figure 4:
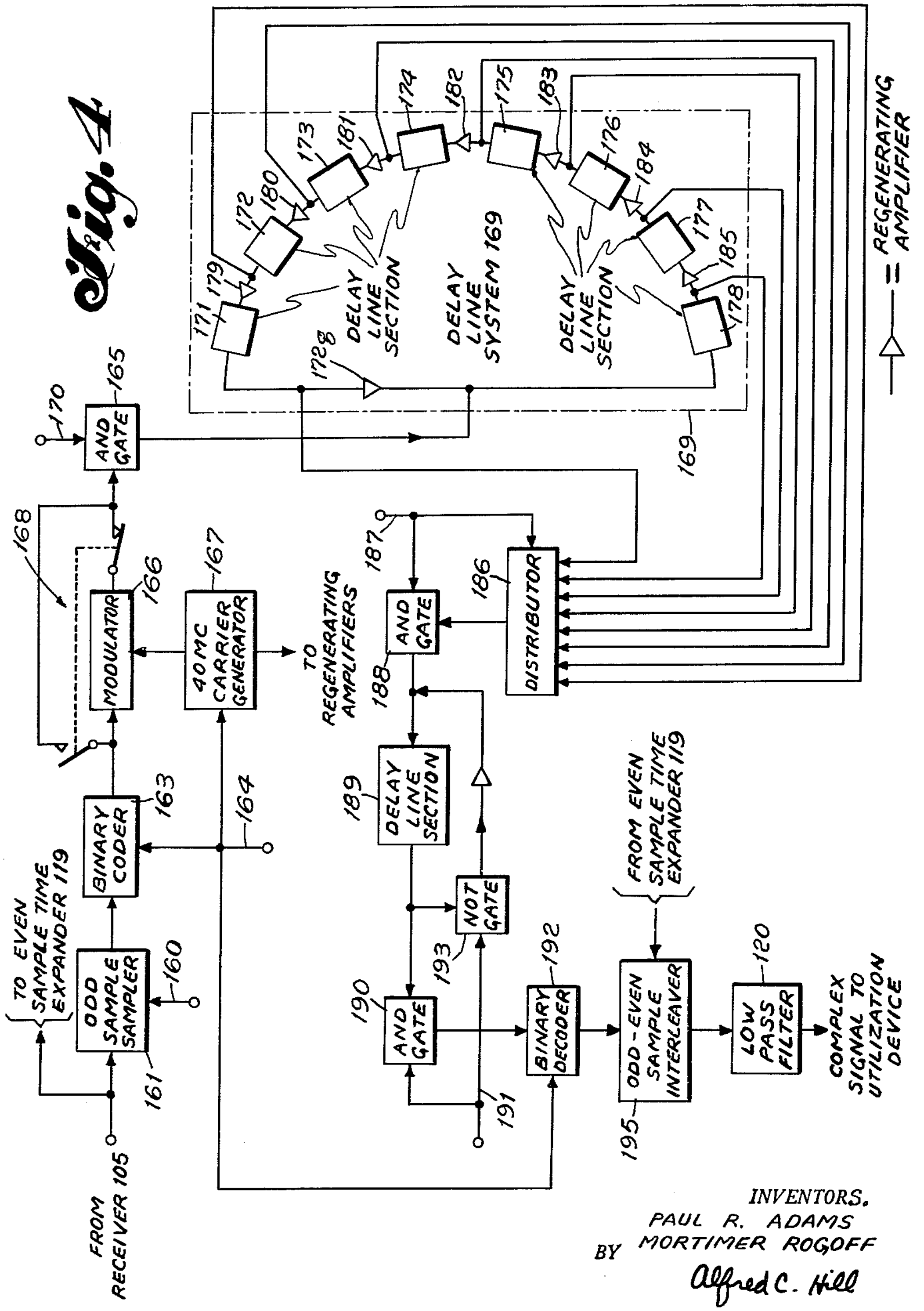
FIG. 4 is a schematic diagram in block form of one half of the time expander of FIG. 1.
Figure 5:
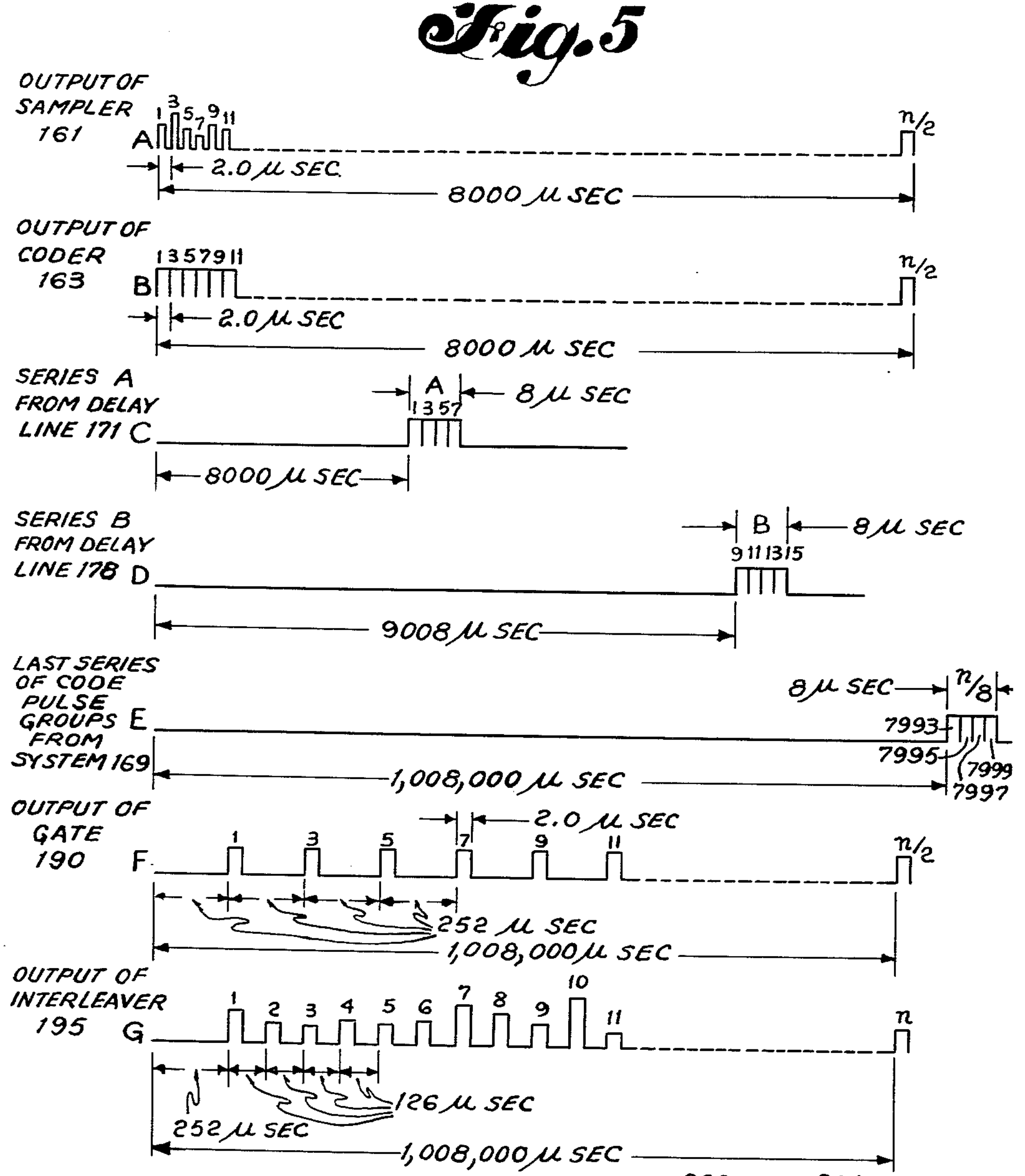
FIG. 5 is a series of curves to assist in the understanding of the operation of the circuit of FIG. 4.

The signal transmitted from transmitter 104 is the complex signal coupled to transducer 114 but in the form of a plurality of condensed signal segments spaced from each other. To recover the original complex signal at the receiver end of the system, it is necessary to reverse the procedure that took place in the transmitting end thereof, that is, the condensed complex signal must be dilated to the full time duration of the signal segments, namely, from 8,000 microseconds to 1.008 seconds. This can be accomplished as is illustrated in FIGS. 4 and 5. The condensed complex signal segments of a particular channel received in receiver 105 is selected from the multichannel signal by the appropriate timing of a timing signal, namely, the signal coupled from timing generator 110 over conductor 160 to the odd-sample sampler 161 of expander 118 and over line 162 to the even sampler of expander 119. The timing of these two timing signals is properly related with a given channel for separation of the channel signal from the multichannel pulse train and also with respect to one another to produce a plurality of time adjacent samples of the condensed signal segment and effectively separate these samples into odd and even sample pulse trains. This separation of samples into odd and even samples is done for substantially the same purpose as described hereinabove with respect to the time compressor. The sampling process is actually carried on in two samplers to reduce accuracy of the timing signal from that which would be required if one sampler were employed as in the case of the time compressor. The timing signals on conductors 160 and 162 each have a rate of 504,000 pulses per 1.008 seconds and a pulse width of one microsecond but time spaced with respect to each other so that a first and third sample is taken by sampler 161 while a sample intermediate these two samples is taken by the sampler of expander 119.

The output of sampler 161 illustrated in curve A, FIG. 5 is coupled to binary coder 163 to convert the amplitude varying samples at the output of sampler 161 to a coded representation thereof as illustrated in curve B, FIG. 5. The composition of these code pulse groups of curve B, FIG. 5 are the same as the composition illustrated in the enlarged portion of curve B, FIG. 3. The timing of the operation of coder 163 is accomplished by a timing signal coupled from generator 110 along conductor 164 and has a rate of 4,032,000 pulses per 1.008 seconds and a pulse width of one eighth of a microsecond. The output of coder 163 may be directly coupled to AND gate 165 when quartz delay line sections are not to be used, or through modulator 166 when quartz delay line sections are being used. As with the compressor of FIG. 2, modulator 166 gates the ultrasonic energy from carrier generator 167 with the video pulse output of coder 163 as described hereinabove with respect to carrier generator 125 and modulator 126 of compressor 116 to provide ultrasonic pulses in the code group. The section of the path between coder 163 and gate 165 may be made with the switching arrangement 168. Assuming the employment of quartz delay lines, the generator 167 timed from conductor 164 will convert the output of coder 163 to ultrasonic pulses for application through AND gate 165 to the first expander delay line system 169.

Delay line system 169, like delay line system 138, is 8,000 microseconds in length composed of eight delay line sections 171 to 178, each having a delay time of 1000 microseconds interconnected by regenerating amplifiers 179 to 185. AND gate 165 is rendered conductive periodically by a timing signal from generator 110 conducted along conductor 170 having a pulse width of 8,000 microseconds and a rate of one pulse per 1.008 seconds to pass the time adjacent code pulse groups at the input thereof to delay line system 169. Thus, delay line system 169 will be filled in 8,000 microseconds with all the time adjacent code pulse groups of a condensed signal segment. As illustrated in FIG. 4, the first code group will be at the output of delay line section 171 and the last code group will be at the input of delay line section 178 at the end of 8,000 microseconds. The output of each of the delay line sections 171 to 178 is coupled to a distributor 186 which may be any of the types mentioned in connection with distributor 134. Distributor 186 is timed by a timing signal coupled from generator 110 along conductor 187 having a rate of 1,000 pulses per 1.008 seconds and a pulse width of eight microseconds.

Immediately after delay line system 169 is filled distributor 186 connects the output of delay line 171 to AND gate 188 whose operation is also controlled by the timing signal on conductor 187. Since gate 188 is conductive for a period of eight microseconds, only code pulse groups 1, 3, 5 and 7, series A will be coupled to the second expander delay line system including delay line section 189 having a time delay of 250 microseconds. This output signal is illustrated in curve C, FIG. 5. The code pulse group of series A will propagate down delay line section 189 and in 252 microseconds, code pulse group 1 will be completely out of delay line section 189. At this instant, AND gate 190 will be rendered conductive by a timing signal conducted along conductor 191 from generator 110 having a pulse width of two microseconds and a rate of 4000 pulses per 1.008 to pass code group 1 to decoder 192. Simultaneously, the feedback path of the second delay line system including NOT gate 193 and regenerative amplifier 194 coupled between the output and input of delay line section 187 is opened when gate 193 becomes nonconductive in response to the timing signal on conductor 191 to prevent code group 1 from circulating in the second delay line system. After code group 1 has been coupled to decoder 192 the conduction condition of gates 190 and 193 reverse and code groups 3, 5 and 7 are circulated through delay line section 189. After passing through sections 189 again, in other words, 252 microseconds later, code group 3 is coupled to decoder 192 by the cooperation of gates 190 and 193 and the timing signal on conductor 191. This circulation and extraction process will continue until code groups 1, 3, 5 and 7 of series A are all removed from delay line section 189 with the desired 252 microsecond separation.

While the code groups of series A are being dilated by the second delay line system, the code groups remaining in delay line system 169 are circulating therein. After the code pulse groups of series A have all been extracted from delay line section 189, that is, after 1008 microseconds have elapsed since series A was extracted from system 169, the timing signal on conductor 187 activates gate 188 and distributor 186 to extract series B from system 169 as illustrated in curve D, FIG. 5. Since the code groups are circulating in system 169, code groups 9, 11, 13 and 15 of series B will be in the proper position in delay line section 178 for extraction from the output thereof. Thus, distributor 186 connects the output of delay line section 178 to gate 188 for application of series B to delay line section 189. Series B will be circulated in delay line section 189 as was series A to separate the code pulse groups contained therein by the desired amount of 252 microseconds. The process of extracting the series of time adjacent code pulse groups from system 169 at the output of each of the delay line sections in sequence as the remaining code groups circulate in system 169 and extracting the code pulse groups from delay line section 189 will continue as described hereinabove for a period of 1.008 seconds, at which time the last series of code pulse groups has been read out of delay line system 169 as illustrated in curve E, FIG. 5 and the code pulse groups have been passed to the output of AND gate 190 as illustrated in curve F, FIG. 5. The pulse code groups at the output of gate 190 are decoded in binary decoder 192, controlled by the timing signal on conductor 164, to provide amplitude varying pulses which are combined with the output of even sample expander 119 in interleaver 195 to provide the amplitude varying pulse output as illustrated in curve G, FIG. 5. The resultant output of interleaver 196 is coupled to low pass filter 120 for recovery of a distortion-free replica of the original complex signal coupled to transducer 114 at the transmitting end of the system.

Figure 6:
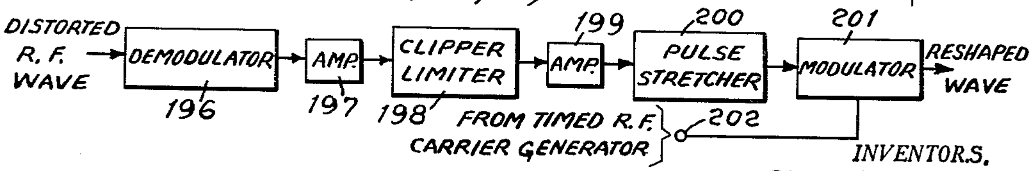
FIG. 6 is a schematic diagram in block form of one embodiment of the regenerating amplifiers utilized in both the circuits of FIGS. 2 and 4.
Figure 7:
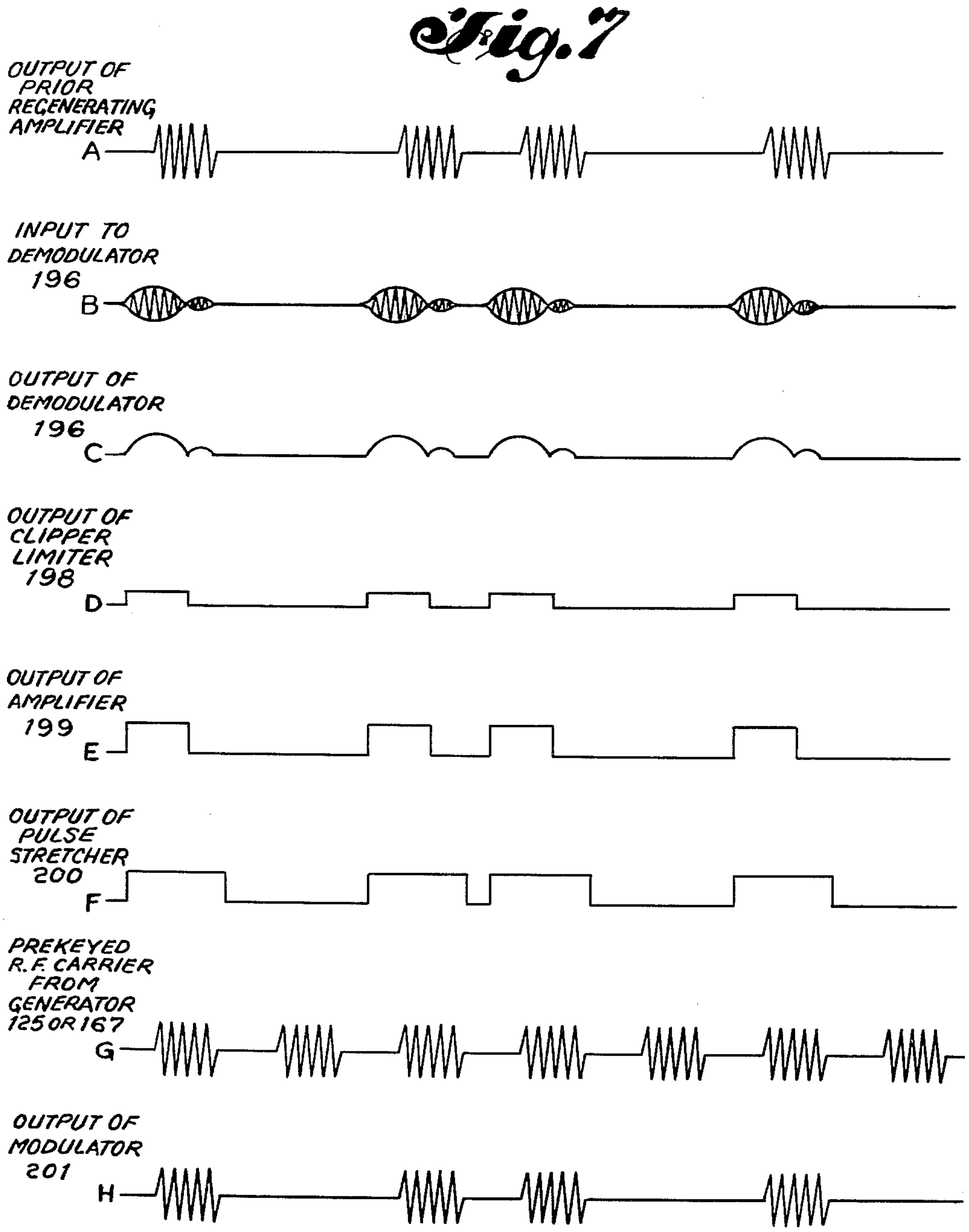
FIG. 7 is a series of curves to assist in the understanding of the operation of the circuit of FIG. 6; and FIGC. 8 to 11 are symbolic representations of the circulating delay line storage system employed in the system of this invention assisting in the explanation of the versatility of such a storage system.

The regenerating amplifiers employed in the delay line storage system of this invention are utilized to maintain the code pulse groups in proper synchronization and properly shaped as these pulse groups proceed through the delay line systems to eliminate errors in timing. A regenerating amplifier which may be utilized in the system of this invention is illustrated in FIG. 6 and described in connection with the curve of FIG. 7. Curve A, FIG. 7 illustrates the shape of an ultrasonic code pulse group which is properly timed and shaped and may be the output of a prior regenerating amplifier. Each of the pulses of the 40 megacycle radio frequency carrier has a duration equal to the duration of a single digit pulse of a code pulse group, namely ⅛ of a microsecond. Curve B, FIG. 6 illustrates the ultrasonic digit pulses of a code pulse group after they have traveled in a delay line section with its resultant distortion. The distorted pulses of radio frequency energy are coupled to demodulator 196. The output of demodulator 196 is the envelope of the distorted pulses of radio frequency energy as illustrated in curve C, FIG. 7. The output of demodulator 196 is coupled to amplifier 197 for amplification and, hence, to clipper-limiter 198 to provide a squared up pulse substantially time coincident with the larger amplitude portion of the output of demodulator 196 as illustrated in curve D, FIG. 7. The output of clipper-limiter 198 is amplified in amplifier 199 to increase the amplitude thereof as illustrated in curve E, FIG. 7. The resultant output of amplifier 199 is operated upon by pulse stretcher 200 to provide a pulse of sufficient duration as illustrated in cure F, FIG. 7, to compensate for any timing errors resulting from changes in the time delay of a delay line section the ultrasonic pulse has just traversed. The output of stretcher 200 is fed to modulator 201. The pre-keyed R–F carrier output from generator 125 or 167 illustrated in curve G, FIG. 7 is coupled to terminal 202 for application to modulator 201. Modulator 201 is in effect a coincidence device which will permit the passage of the pre-keyed radio frequency carrier if there is a pulse output from stretcher 200 but will blank the pre-keyed radio frequency carrier if there is no output from stretcher 200. The reshaped and retimed output of modulator 201 is illustrated in curve H, FIG. 7. The regenerating amplifier of FIG. 6, therefore, provides reshaped and retimed ultrasonic pulses to correct for distortion which takes place in the passage of the pulse through a delay line anl likewise corrects for slight timing inaccuracies experienced in the delay line sections to cooperate in maintaining the desired characteristics of this system.

The time compressor and expander system of this invention has been described hereinabove with respect to a transmission system wherein a plurality of complex signals have been time compressed and then time interleaved with respect to one another for transmission over a single radio frequency channel which at the receiving end are reconstructeed and returned to their original time duration by the action of a time expander. The description of the circuitry of this system in this environment was not meant to limit the utility of the time compressor and expander to this type of system. It will be obvious to those skilled in the art that the time compressor and expander arrangement desclosed herein can be employed in many other systems where it is desired to better utilize the available portion of the frequency spectrum. Within one geopraphical location it would be possible to provide a transmission system in accordance with this invention which would replace many narrow-band systems with a few wideband systems having the possibility of greater channel capacity than was present in the narrow-band systems. It would be also possible to utilize the compressor and expander arrangemenet of this invention to provide a secrecy transmission system so that unauthorized persons would not have access to information transmitted in accordance with the principles of this invention.

Figure 8:
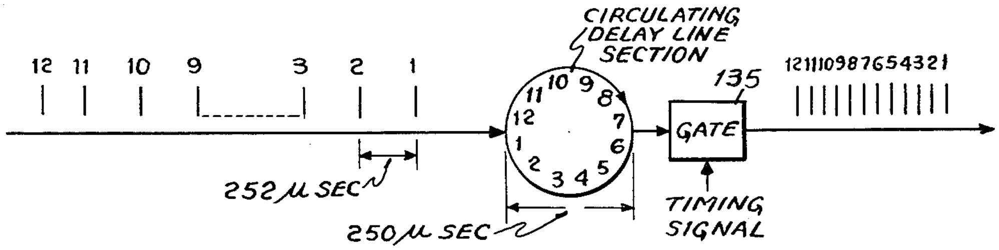

Referring to FIG. 8, there is illustrated therein a symbolic representation of a circulating delay line system identical in structure to the circulating delay line system of FIG. 2 including delay line section 132 and "AND" gate 135. Delay line section 132 and its feedback path from its output to its input is represented in FIG. 8 as a circle with the arrow indicating teh direction of circulation. The arrangement illustrated in FIG. 8 operates along the same principles as described in connection with FIG. 2. However, to illustrate the versatility of the circulating delay line, particularly for secrecy transmission systems, the number of pulse signals being condensed in time has been increased from four to twelve. The spacing or time interval between adjacent ones of the pulse signals, as in FIG. 2, is greater than the length of the delay line. This is illustrated in FIG. 8 by the specified times. Thus, as the pulses are applied in sequence to the input of the delay line the preceding pulse or pulses will have just cleared the delay line section input for travel along the delay line section as the succeeding pulse enters the delay line section. Hence, when pulse 1 has entered two microseconds into the delay line section after completing a full circulation, pulse 2 will enter the delay line and thus be disposed in time adjacent relationship to pulse 1. After pulses 1 and 2 have entered four microseconds into the delay line section upon the next circulation pulse 3 will enter thus disposing pulses 1, 2 and 3 in time adjacent relationship. As in the case of FIG. 2 this circulating process will continue until all twelve pulses are present in the delay line section in the same sequence as they were applied to the input of the delay line section as indicated by the numerals around the circle. After the twelfth pulse has entered the delay line proper timing by a timing signal applied to gate 135 will read out the condensed pulses in the order in which they are present in the delay line section. This condensed plurality of pulse signals is illustrated at the output of gate 135. The sequence of the pulse signals within the delay line section is determined by the relationship between the interval between adjacent pulses and the time delay of the delay line.

Figure 9:
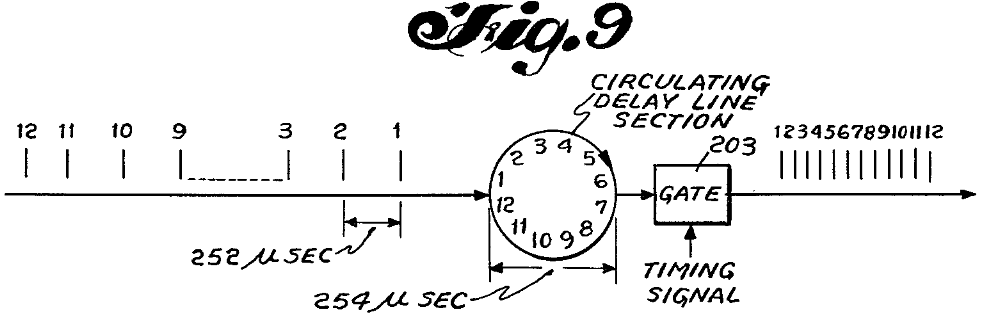

Referring to FIG. 9, one variation is illustrated to demonstrate the versatility of this circulating delay line storage system. By adjusting the delay line section to have a time delay greater than the time interval between adjacent pulses, it is possible to produce the desired condensed pulse signals but having a sequence opposite to the sequence of the pulse signal applied to the input of the delay line section. Thus, if the time interval between adjacent pulses at the output of the delay line is 252 microseconds and the delay has a length of 254 microseconds, it will be observed that the sequence of the pulses present in the delay line section after all the input pulses have been applied thereto are in reverse order relative to the sequence of the input pulses. This comes about by the fact that the first pulse has not arrived at the input of the delay line through the feedback path when the second pulse is applied to the input so that when the second pulse starts to travel down the delay line, the first pulse will follow the second pulse in its second trip through the delay line section. When the third pulse is about to enter the delay line the first and second pulses are still in the circulating feedback path and will enter the delay line section just as the third pulse has completely entered the delay line and starts its propagation down the delay line. This process will continue until all the pulses are condensed in time and disposed in a reversed sequence relative to the sequence of the pulses applied at the input. Activation of gate 203 at the output of the delay line section by a properly constituted timing signal there will be applied at the output of the delay line system condensed pulse signals but in reverse sequence relative to the input pulse signal sequence.

Figure 10:
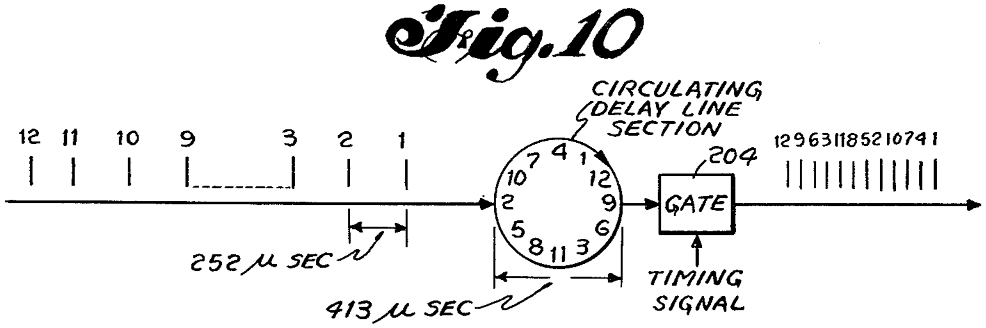

Referring to FIG. 10, there is illustrated therein still another variation possible with the circulating delay line system of this invention which results in a condensed output but having the pulses in a scrambled sequence. The illustration demonstrates the pulse signal scrambling resulting from the input pulses have a time interval between adjacent ones thereof equal to just slightly greater than ⅓ of the time delay of the delay line section. Relating this to the example herein if the interval between adjacent pulses is maintained at 252 microseconds, the delay line would have a length of 413 microseconds. Thus, when pulse 1 has traveled just slightly greater than ⅓ the length of the delay line, pulse 2 enters the delay line. When pulses 1 and 2 have progressed slightly greater than ⅓ further in their travel, pulse 3 enters the delay line. This circulation process continues until all the pulse signals have been applied to the delay line section resulting in the sequence as illustrated by the numerals around the circumference of the circle. By properly timing gate 204 by a timing signal having a width equal to the width of the condensed twelve pulse signals, we may obtain an output signal having the sequence illustrated at the output of gate 204, the same sequence of the pulses as is present in the delay line section. It is possible to alter the prescribed sequence in the delay line section to any desired predetermined sequence at the output of the storage system by adjusting the timing of the timing signal so that the gate 204 is not opened until said pulse 7 will be the first pulse out of gate 204 with the rest of the pulses following in the prescribed sequence.

Figure 11:
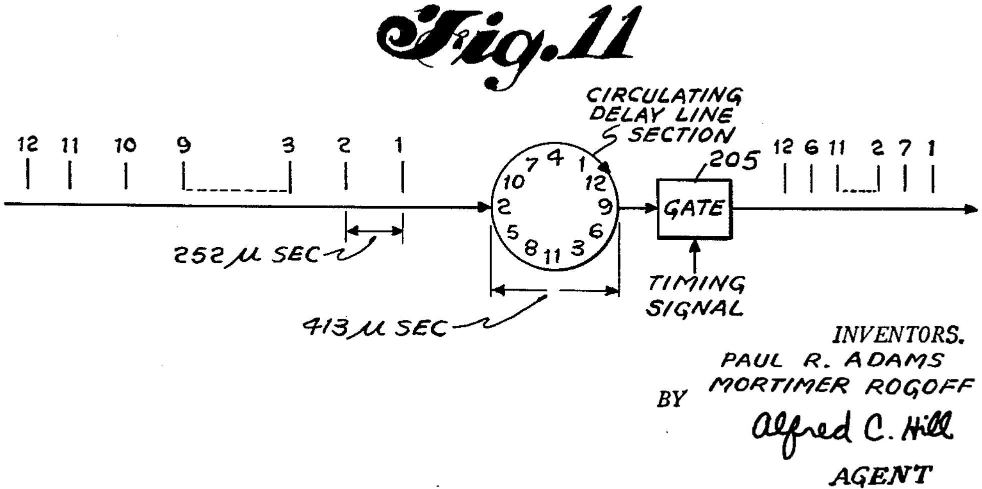

Also as illustrated in FIG. 11, the timing signal operating on a gate 205 to remove pulses in the prescribed sequence in the delay line section may produce an output as illustrated at the output of gate 205. In this instance the timing signal has a width equal to the width of the pulse signal and a rate sufficient to open gate 205 to pass every other pulse in the prescribed sequence in the delay line section. In this manner, the prescribed sequence of pulse signals in the delay line section is altered to a different predetermined sequence of pulse signals at the output of gate 205, namely 1, 7, 2 and so forth. Also the spacing between adjacent pulses in the condensed pulse signal has been altered at the output of the storage system. This same technique may be employed with respect to FIGS. 8, 9 and 10 to alter the sequence of pulse signals at the system output with respect to the sequence of pulse signals in the delay line section.

The four examples of the versatility of the circulating delay line system of this invention illustrated and described in connection with FIGS. 8 to 11 are only a small number of possible variations that may be produced in the pulse signal sequence and condensed spacing between adjacent pulses. The scrambling of the pulse signals representative of a complex signal segment produces a signal for transmission which is particularly applicable to secrecy transmission systems since it would be relatively difficult for an unauthorized person to unscramble the scrambled signal segment and thereby have access to the information transmitted. With respect to all of these variations of the circulating delay line system, it should be pointed out that preferably the resultant scrambled pulse signals are converted to a continuous wave type signal having a scrambled characteristic. In other words, the scrambled pulse signals are demodulated and the envelope of this demodulation is employed in the transmission of the complex signal.

The description of FIGS. 8 to 11 has been directed toward the condensing of pulse signals. However, in accordance with the principles of this invention described in connection with FIG. 4, the time expansion of pulse signals and unscrambling thereof may be accomplished by substantially reversing the process employed in time compressing and scrambling pulse signals.

While we have described above the principles of our invention in connection with specific apparatus, it is to be clearly understood that this description is made only by way of example and not as a limitation to the scope of our invention as set forth in the objects thereof and in the accompanying claims.

We claim:

1. A complex signal time compressor comprising a source of complex signals, means coupled to said source to divide said complex signals into a plurality of successive signal segments each having a first time duration, and a translation device coupled to said dividing means sequentially condensing each of said signal segments into a second time duration less than said first time duration, said translation device including means to sequentially convert each of said signal segments into a plurality of pulse signals representative thereof, adjacent ones of said pulse signals being spaced by a given time interval, a delay line storage system coupled to said converting means to translate the pulse signals of each of said plurality of pulse signals into a time adjacent relationship with respect to each other to condense each of said plurality of pulse signals into said second time duration, and means coupled to the output of said storage system to recover the signal represented by each of said plurality of condensed pulse signals to provide condensed complex signal segments spaced from each other by a predetermined time interval.

2. A complex signal time compressor comprising a source of complex signals, means coupled to said source to divide said complex signals into a plurality of successive signal segments each having a first time duration, and a translation device coupled to said dividing means sequentially condensing each of said signal elements into a second time duration less than said first time duration, said translation device including a sampling means to sequentially derive a plurality of signal samples from each of said signal segments, a first signal path coupled to the output of said sampling means responsive to the odd-numbered ones of each of said plurality of signal samples, a second signal path coupled to the output of said sampling means responsive to even-numbered ones of each of said plurality of signal samples, each of said signal paths including means to convert the designated ones of said signal samples of each of said plurality of signal samples into a plurality of pulse signals representative thereof, adjacent ones of said pulse signals being spaced by a given time interval, and a delay line storage system coupled to said converting means to translate the pulse signals of each of said plurality of pulse signals into a time adjacent relationship with respect to each other to condense each of said plurality of pulse signals into said second time duration, and means coupled to each of said first and second paths appropriately combining the condensed plurality of pulse signals at the output of each of said storage devices to recover the signal represented by the appropriately combined condensed plurality of pulse signals to provide condensed complex signal segments spaced from each other by a predetermined time interval.

3. A complex signal time compress or comprising a source of complex signals, means coupled to said source to divide said complex signals into a plurality of successive signal segments each having a first time duration, and a translation device coupled to said dividing means sequentially condensing each of said signal segments into a second time duration less than said first time duration, said translation device including means to sequentially convert each of said signal segments into a plurality of code pulse groups representative thereof, adjacent ones of said code groups being spaced by a first given time interval, a delay line storage system coupled to said converting means to translate said code groups of each of said plurality of code groups into a time adjacent relationship with respect to each other to condense said plurality of code groups into said second time duration, and means coupled to the output of said storage system to recover the signal represented by each of said plurality of condensed code groups to provide condensed complex signal segments spaced from each other by a predetermined time interval.

4. A compressor according to claim 3, wherein said storage system comprises a first delay line system including at least one delay line section having a first time delay slightly less than said first time interval, means coupling the output of said converting means to the input of said one delay line section, means coupled between the output and input of said one delay line section to circulate each of said code groups through said one delay line section in a prescribed sequence to translate said code groups into a plurality of series of time adjacent code groups, each of said series having a given number of code groups therein, adjacent ones of said series having a second given time interval therebetween, a second delay line system including a plurality of delay line sections each having a second time delay equal to said second given time interval, the total time delay of said second delay line system being equal to said second time duration, and means interconnecting said plurality of delay line sections to provide a signal circulating loop, means coupling the output of said first delay line system sequentially to the input of each of said plurality of delay line sections after the formation of each of said plurality of series of code groups to dispose said plurality of series of code groups in time adjacent relationship with respect to each other to condense said plurality of code groups into said second time duration.

5. A compressor according to claim 4, wherein each of said delay line sections are quartz delay lines and said converting means includes a source of ultrasonic energy and gate means coupled to said source of energy and responsive to the pulses of said code groups to provide ultrasonic pulses in said code groups for propagation in said quartz delay lines.

6. A complex signal time expander comprising a source of complex signals consisting of a plurality of complex signal segments spaced from each other by a predetermined time interval, and a translation device coupled to said source sequentially dilating each of said signal segments to a duration including said predetermined time interval to render said complex signal continuous, said translation device including means to sequentially convert each of said signal segments into a plurality of pulse signals representative thereof, said pulse signals being disposed in time adjacent relationship, a delay line storage system coupled to said converting means to translate the pulse signal of each of said plurality of pulse signals into a given time spaced relationship with respect to each other to dilate each of said plurality of pulse signals to a duration including said predetermined time interval, and means coupled to the output of said storage system to recover the signal represented by each of said plurality of dilated pulse signals to provide a continuous complex signal.

7. A complex signal time expander comprising a source of complex signals consisting of a plurality of complex signal segments spaced from each other by a predetermined time interval, and a translation device coupled to said source sequentially dilating each of said signal segments to a duration including said predetermined time interval to render said complex signal continuous, said translation device including a sampling means to sequentially derive a plurality of signal samples from each of said signal segments, a first signal path coupled to the output of said sampling means responsive to odd-numbered ones of each of said plurality of signal samples, a second signal path coupled to the output of said sampling means responsive to even-numbered ones of each of said plurality of signal samples, each of said signal paths including means to convert the designated ones of said signal samples of each of said plurality of signal samples into a plurality of pulse signals representative thereof, said pulse signals being disposed in time adjacent relationship, and a delay line storage system coupled to said converting means to translate the pulse signals of each of said plurality of pulse signals into a given time spaced relationship with respect to each other to dilate each of said plurality of pulse signals to a duration including said predetermined time interval, and means coupled to each of said first and second paths appropriate combining the plurality of dilated pulse signals in each of said storage devices to recover the signal represented by each of said appropriately combined plurality of dilated pulse signals to provide a continuous complex signal.

8. A complex signal time expander comprising a source of complex signals consisting of a plurality of complex signal segments spaced from each other by a predetermined time interval, and a translation device coupled to said source sequentially dilating each of said signal segments to a duration including said predetermined time interval to render said complex signal continuous, said translation device includes means to sequentially convert each of said signal segments into a plurality of code pulse groups representative thereof, said code groups having a time adjacent relationship, a delay line storage system coupled to said converting means to translate said code groups of each of said plurality of code groups into a given time spaced relationship with respect to each other to dilate each of said plurality of code groups to a duration including said predetermined time interval, and means coupled to the output of said storage system to recover the signal represented by each of said plurality of dilated code groups to provide a continuous complex signal.

9. An expander according to claim 8, wherein said storage system comprises a first delay line system including a plurality of delay line sections each having a first time delay equal to a given fraction of the time duration of each of said signal segments and means interconnecting said plurality of delay line sections to provide a signal circulating loop, means coupled to said converting means to sequentially introduce said code pulse groups of each of said signal segments into said circulating loop for circulation therein, a second delay line system including at least one delay line section having a second time delay less than said first time delay, means sequentially coupling the output of each of said plurality of delay line sections to the input of said one delay line section in a predetermined order to extract a given number of said code groups from each of said plurality of delay line sections to provide a plurality of series of code pulse groups, adjacent ones of said plurality of series of code pulse groups being spaced from each other a given time interval, said given time interval being equal to said first time delay, means coupled between the output and input of said one delay line section to circulate each of said series of code groups through said one delay line sections a predetermined number of times and means coupled to the output of said second delay line system to extract said code groups therefrom sequentially after circulation therein said predetermined number of times to provide said given time spaced relationship between each of said code groups to dilate each of said plurality of code groups to a duration including said predetermined time interval.

10. An expander according to claim 9, wherein each of said delay line sections are quartz delay lines and said converting means includes a source of ultrasonic energy and gate means coupled to said source of energy and responsive to the pulses of said code groups to provide ultrasonic pulses in said code groups for propagation in said quartz delay lines.

11. A complex signal transmission system comprising a source of complex signals, means coupled to said source to divide said complex signals into a plurality of successive signal segments each having a first time duration, first means responsive to said signal segments to sequentially convert each of said signal segments into a first plurality of pulse signals representative thereof, adjacent ones of said pulse signals of said first plurality of pulse signals being spaced by a given time interval, a first delay line storage system coupled to said first converting means to translate the pulse signals of each of said first plurality of pulse signals into a time adjacent relationship with respect to each other to condense said pulse signals of each of said plurality of pulse signals into a second time duration less than said first time duration, means coupled to the output of said first storage system to demodulate each of said condensed plurality of pulse signals to provide condensed complex signal segments spaced from each other by a predetermined amount, means coupled to said demodulator means to propagate the condensed complex signal segments, means to receive said condensed complex signal segments, second means coupled to said receiving means to sequentially convert each of said condensed signal segments into a second plurality of pulse signals representative thereof, adjacent ones of said pulse signals of said second plurality of pulse signals being disposed in time adjacent relationship, a second delay line storage system coupled to said second converting means to translate the pulse signals of each of said second plurality of pulse signals into a given time spaced relationship with respect to each other to dilate said pulse signals each of said second plurality of pulse signals to occupy said first time duration and means coupled to the output of said second storage system to recover the signal segment represented by each of said plurality of dilated pulse signals to provide a continuous complex signal.

12. A multichannel complex signal transmisison system comprising a plurality of signal channels each including a source of complex signals, means coupled to said source to divide said complex signals into a plurality of successive signal segments each having a given time duration, a first means responsive to said signal segments to sequentially convert each of said signal segments into a first plurality of pulse signals representative thereof, adjacent ones of said pulse signals of said first plurality of pulse signals being spaced by a given time interval, a first delay line storage system coupled to said first converting means to translate the pulse signals of each of said first plurality of pulse signals into a time adjacent relationship with respect to each other to condense said pulse signals of each of said first plurality of pulse signals into a time duration less than said first time duration and spacing adjacent ones of said plurality of condensed pulse signals by a given time period, and means coupled to the output of said first storage system to recover the signal represented by each of said plurality of condensed pulse signals to provide condensed complex signal segments spaced from each other by said given time period; a means common to the output of each of said signal channels to interleave said condensed signal segments of each of said signal channels in said given time period; means coupled to said common means to propagate said interleaved condensed signal segments; means to receive said propagated signal; and a plurality of signal paths coupled to said receiving means, each of said signal paths being responsive to the condensed signal segments of one of said signal channels in said propagated signal, each of said signal paths including a second means to sequentially convert each of the condensed signal segments of said one of said signal channels into a second plurality of pulse signals representative thereof, adjacent ones of said pulse signals of said second plurality of pulse signals being disposed in time adjacent relationship, a second delay line storage system coupled to said second converting means to translate the pulse signals of each of said second plurality of pulse signals into a given time spaced relationship with respect to each other to dilate said pulse signal of each of said second plurality of pulse signals to occupy said given time duration, and means coupled to the output of said second storage system to recover the signal represented by each of said plurality of dilated pulse signals to provide a continuous complex signal.

13. A complex signal time compressor comprising a source of complex signals, means coupled to said source to divide said complex signals into a plurality of successive signal segments each having a given time duration, means responsive to said signal segments to sequentially convert each of said signal segments into a plurality of pulse signals representative thereof, adjacent ones of said pulse signals being spaced by a given time interval, a translation device including a delay line storage system coupled to said converting means to translate the pulse signals of each of said plurality of pulse signals into a time adjacent relationship with respect to each other to condense said plurality of pulse signals into a time duration less than said given time duration, and means coupled to said translation device to utilizes said condensed pulse signals.

14. A complex signal time compressor comprising a source of complex signals, means coupled to said source to divide said complex signals into a plurality of successive signal segments each having a given time duration, means responsive to said signal segments to sequentially convert each of said signal segments into a plurality of pulse signals representative thereof, adjacent ones of said pulse signals being spaced by a given time interval, a translation device including a delay line storage system coupled to said converting means to translate the pulse signals of each of said plurality of pulse signals into a time adjacent relationship with respect to each other to condense said pulse signals of each of said plurality of pulse signals into a time duration less than said given time duration and spacing adjacent ones of said plurality of condensed pulse signals a predetermined amount, and means coupled to the output of said translation device responsive to each of said plurality of condensed pulse signals to reconstruct said complex signal.

15. A delay line storage system comprising at least one delay line section having a given time delay, a source of a plurality of pulse signals having a predetermined time interval between adjacent ones thereof coupled to the input of said delay line section, said predetermined time interval being related to said given time delay by a predetermined relationship, the pulse signals of said plurality of pulse signals being applied to the input of said delay line section in a given sequence, means to couple the output of said delay line section to the input of said delay line section to alter the time relationship of the pulse signals of said plurality of pulse signals by circulation thereof through said delay line section to dispose the pulse signals of said plurality of pulse signals in a prescribed sequence in said delay line section having a time interval between adjacent ones thereof different than said predetermined time intervals, said prescribed sequence being determined by said predetermined relationship, and means coupled to the output of said delay line section to remove said altered plurality of pulse signals from said delay line section with the pulse signals of said altered plurality of pulse signals disposed in a predetermined sequence.

16. A delay line storage system comprising at least one delay line section having a given time delay, a source of a plurality of pulse signals having a predetermined time interval between adjacent ones thereof coupled to the input of said delay line section, said predetermined time interval being related to said given time delay by a predetermined relationship, the pulse signals of said plurality of pulse signals being applied to the input of said delay line section in a given sequence, means to couple the output of said delay line section to the input of said delay line section to alter the time relationship of the pulse signals of said plurality of pulse signals by circulation thereof through said delay line section to dispose the pulse signals of said plurality of pulse signals in a prescribed sequence in said delay line section having a time interval between adjacent ones thereof different than said predetermined time intervals, said prescribed sequence being determined by said predetermined relationship, and means coupled to the output of said delay line section to remove said altered plurality of pulse signals from said delay line section with the pulse signals of said altered plurality of pulse signals disposed in said prescribed sequence.

17. A delay line storage system comprising at least one delay line section having a given time delay, a source of a plurality of pulse signals having a predetermined time interval between adjacent ones thereof coupled to the input of said delay line section, said predetermined time interval being related to said given time delay by a predetermined relationship, the pulse signals of said plurality of pulse signals being applied to the input of said delay line section in a give sequence, means to couple the output of said delay line section to the input of said delay line section to alter the time relationship of the pulse signals of said plurality of pulse signals by circulation thereof through said delay line section to dispose the pulse signals of said plurality of pulse signals in a prescribed sequence in said delay line section having a time interval between adjacent ones thereof different than said predetermined time intervals, said prescribed sequence being determined by said predetermined relationship, and means coupled to the output of said delay line section to remove said altered plurality of pulse signals from said delay line section with the pulse signals of said altered plurality of pulse signals disposed in a predetermined scrambled relationship with respect to said prescribed sequence.

18. A delay line storage system comprising at least one delay line section having a given time delay, a source of a plurality of pulse signals having a predetermined time interval between adjacent ones thereof coupled to the input of said delay line section, said given time delay being slightly less than said predetermined time interval, the pulse signals of said plurality of pulse signals being applied to the input of said delay line section in a given sequence, means to couple the output of said delay line section to the input of said delay line section to alter the time relationship of the pulse signals of said plurality of pulse signals by circulation thereof through said delay line section to dispose the pulse signals of said plurality of pulse signals in said given sequence in said delay line section having a time interval between adjacent ones thereof different than said predetermined time intervals, and means coupled to the output of said delay line section to remove said altered plurality of pulse signals from said delay line section with the pulse signals of said altered plurality of pulse signals disposed in a predetermined sequence.

19. A delay line storage system comprising at least one delay line section having a given time delay, a source of a plurality of pulse signals having a predetermined time interval between adjacent ones thereof coupled to the input of said delay line section, said given time delay being slightly greater than said predetermined time interval, the pulse signals of said plurality of pulse signals being applied to the input of said delay line section in a given sequence, means to couple the output of said delay line section to the input of said delay line section to alter the time relationship of the pulse signals of said plurality of pulse signals by circulation thereof through said delay line section to dispose the pulse signals of said plurality of pulse signals in a sequence opposite to said given sequence in said delay line section having a time interval between adjacent ones thereof different than said predetermined time intervals, and means coupled to the output of said delay line sections to remove said altered plurality of pulse signals from said delay line section with the pulse signals of said altered plurality of pulse signals disposed in a predetermined sequence.

20. A delay line storage system comprising at least one delay line section having a given time delay, a source of a plurality of pulse signals having a predetermined time interval between adjacent ones thereof coupled to the input of said delay line section, said given time delay being greater than said predetermined time interval by a given amount, the pulse signals of said plurality of pulse signals being applied to the input of said delay line section in a given sequence, means to couple the output of said delay line section to the input of said delay line section to alter the time relationship of the pulse signals of said plurality of pulse signals by circulation thereof through said delay line section to dispose the pulse signals of said plurality of pulse signals in a predetermined scrambled relationship relative to said given sequence in said delay line section having a time interval between adjacent ones thereof different than said predetermined time intervals, said scrambled relationship being determined by said given amount, and means coupled to the output of said delay line section to remove said altered plurality of pulse signals from said delay line section with the pulse signals of said altered plurality of pulse signals disposed in a predetermined sequence.

References Cited by the Examiner

UNITED STATES PATENTS

| | | | |
|---|---|---|---|
| 2,569,927 | 10/51 | Gloess et al. | 332—1 |
| 2,619,636 | 11/52 | Veaux | 179—15.55 |
| 2,650,949 | 9/53 | Veaux | 179—15.55 |
| 2,800,580 | 7/57 | Davies | 340—347 |
| 2,852,750 | 9/58 | Goldberg | 333—29 |
| 2,912,506 | 11/59 | Hughes | 179—15 |

OTHER REFERENCES

D. L. Arenberg: "Basic Types Of Delay Lines," Instruments And Automation, pp. 1676–1678, vol. 31, October 1958.

DAVID G. REDINBAUGH, *Primary Examiner.*

ROBERT H. ROSE, *Examiner.*